(12) United States Patent
Agrawal et al.

(10) Patent No.: US 6,606,661 B1
(45) Date of Patent: Aug. 12, 2003

(54) METHOD FOR DYNAMIC CONNECTION CLOSING TIME SELECTION

(75) Inventors: Prathima Agrawal, New Providence, NJ (US); Moncef Elaoud, Madison, WI (US); Parameswaran Ramanathan, Madison, WI (US); Cormac John Sreenan, Carrigadrokid (IE)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/470,795

(22) Filed: Dec. 23, 1999

Related U.S. Application Data
(60) Provisional application No. 60/113,398, filed on Dec. 23, 1998.

(51) Int. Cl.[7] .............................................. G06F 15/16
(52) U.S. Cl. ..................... 709/227; 709/229; 709/225; 709/217; 709/219; 700/244; 700/241
(58) Field of Search ................................ 709/224, 225, 709/227, 103, 229, 217

(56) References Cited

U.S. PATENT DOCUMENTS

| | | | | |
|---|---|---|---|---|
| 5,761,683 A | * | 6/1998 | Logan et al. ............... 707/513 |
| 6,006,269 A | * | 12/1999 | Phaal ......................... 709/103 |
| 6,078,943 A | * | 6/2000 | Yu .............................. 709/102 |
| 6,128,279 A | * | 10/2000 | O'Neil et al. ............... 370/229 |
| 6,259,705 B1 | * | 7/2001 | Takahashi et al. .......... 370/230 |
| 6,317,786 B1 | * | 11/2001 | Yamane et al. ............. 709/224 |

* cited by examiner

Primary Examiner—David Wiley
Assistant Examiner—Phuoc H. Nguyen

(57) ABSTRACT

The present invention discloses a method of improving the performance of a server enabled to permit connections to clients to persist for a duration equal to a timer value, such as Web servers utilizing HTTP/1.1. In accordance with an embodiment of the present invention, the server estimates the load on the server and uses the estimate to modify the timer value. The timer value can be chosen to balance the need to increase the throughput as seen by the clients and the server need to service the largest possible number of clients without running out of resources. The timer value can be set to a longer value when the server load is light and a shorter value when the server load is heavy. In a preferred embodiment of the present invention, the server dynamically selects the largest timer that guarantees that the server does not run out of resources under the current measured load.

3 Claims, 4 Drawing Sheets

OFF-LINE PHASE

301 — CALCULATE $G(T), T \in [0, T_{max}]$

302 — STORE G(T) IN TABLE INDEXED BY T

RUN TIME PHASE

311 — EVERY Λ SECONDS, MEASURE N

312 — ESTIMATE MTBR

313 — CHOOSE T* FROM G(T) TABLE, BASED ON MTBR

OFF-LINE PHASE

301 — CALCULATE
$G(T), T \in [0, T_{max}]$

302 — STORE G(T) IN TABLE INDEXED BY T

RUN TIME PHASE

311 — EVERY Λ SECONDS, MEASURE N

312 — ESTIMATE MTBR

313 — CHOOSE T* FROM G(T) TABLE, BASED ON MTBR

Figure 3

```
1001   handle_client_request()
1002   {
1003          i = client[c].socket;
1004          if (i ≠ no_socket)
1005          {
1006                  service_request_on_socket(i);
1007                  socket[i].closing_time = current_time + T*;
1008          }
1009          else
1010          {
1011                  if (free_sockets ≠ 0)
1012                  {
1013                          i = get_socket(client[c]);
1014                          service_request_on_socket(i);
1015                          socket[i].closing_time = current_time + T*;
1016                  }
1017                  else
1018                          reject_connection();   ( or queue request )
1019          }
1020   }
```

Figure 4

METHOD FOR DYNAMIC CONNECTION CLOSING TIME SELECTION

CROSS REFERENCE TO RELATED APPLICATIONS

This application claims priority to Provisional Application Serial No. 60/113,398, filed on Dec. 23, 1998, the content of which is incorporated by reference herein.

FIELD OF THE INVENTION

The present invention relates generally to communication networks, and, more particularly, to protocols for establishing connections in a communication network.

BACKGROUND OF THE INVENTION

The HyperText Transfer Protocol (HTTP) is an application-level request/response protocol for distributed hypermedia information systems. HTTP is used by the World Wide Web by clients, typically browser applications like Mosaic or Netscape Navigator, to retrieve information from remote servers. HTTP relies on a reliable transport protocol to send data over the Internet. The Transmission Control Protocol (TCP) is the most widely used transport protocol in conjunction with HTTP. To download a Web page, for instance with reference to FIG. 1, the client 110 must use a three-way handshake in order to initiate a TCP connection. The client 110 sends a segment of data 131 requesting a connection to the server; the server 120 responds to the request 132; and the client must acknowledge the server's response 133 before a connection is established, as set forth in FIG. 1. The server 120 responds 151 to the HTTP request 134 by sending the base page and links to the embedded objects. The client 110 then requests separately the embedded objects using the links.

In HTTP/1.0, the version of HTTP used by most Web browsers and servers today, each client request is serviced using a new TCP connection. To speed up the data transfer, current Web browsers establish several (usually four) parallel TCP connections to the server. This practice has been shown to have negative effects on the already congested Internet. The inefficiency of HTTP/1.0 has been attributed to a number of problems: (1) the connection setup time 130 (two network round trip delays) and server processing time 140 required prior to each data transmission; (2) the use of "slow start" congestion-avoidance algorithms in TCP reducing the throughput; (3) the overhead imposed on servers by excessive opening and closing of connections rendering the server artificially busy; and (4) the depletion of available sockets, especially problematic given the time-wait state imposed by TCP which can cause busy servers to quickly run out of sockets.

The new version of HTTP, HTTP/1.1, is designed to overcome some of the problems of HTTP/1.0. See R. Fielding et. al., "Hypertext Transfer Protocol—HTTP/1.1", RFC 2068, Network Working Group, 1997; R. Fielding et. al., "Hypertext Transfer Protocol—HTTP/1.1", RFC 2616, Network Working Group, 1999. HTTP/1.1 is aimed at improving the throughput and the delay as perceived by a client, while decreasing the server load, by allowing a TCP connection to persist beyond the lifetime of a single request-reply cycle. Multiple requests from a client can be pipelined on the same TCP connection resulting in higher throughput and shorter response time. The downside is that each persistent TCP connection requires a socket at the server. Since the number of sockets at the server is limited, keeping connections open for long periods of time may prevent potential clients form connecting to the server if no sockets are available. Keeping sockets open also incurs server overhead to keep track of each data structure. There is a tradeoff between the number of clients a server can serve and the throughput and delay perceived by each client.

The standard specification for HTTP/1.1 leaves the decision on when to close a persistent connection to the implementer. The standard suggests the use of a fixed timeout period, after which a server automatically closes a connection. Other suggested solutions include using a quasi-dynamic solution where two fixed timers are used—a short timeout period (of one second) when the server receives the first request, and a maximum timeout value if the server receives a second request prior to the timeout. Others have suggested closing the connection after servicing a fixed number of requests. Version 1.3.1 of the Apache Web server uses a combination solution—a connection is closed if it has been idle for 15 seconds or 100 requests have been serviced on the connection, whichever occurs first.

None of these solutions take into account a factor that can drastically change the efficacy of a given timer value: namely, the variability of the server load during different hours of the day and different days of the week.

SUMMARY OF THE INVENTION

The present invention discloses a method of improving the performance of a server enabled to permit connections to clients to persist for a duration equal to a timer value, such as Web servers utilizing HTTP/1.1. In accordance with an embodiment of the present invention, the server estimates the load on the server and uses the estimate to modify the timer value. The timer value can be chosen to balance the need to increase the throughput as seen by the clients and the server need to service the largest possible number of clients without running out of resources. The timer value can be set to a longer value when the server load is light and a shorter value when the server load is heavy. In a preferred embodiment of the present invention, the server dynamically selects the largest timer that guarantees that the server does not run out of resources under the current measured load.

These and other advantages of the invention will be apparent to those of ordinary skill in the art by reference to the following detailed description and the accompanying drawings.

BRIEF DESCRIPTION OF THE DRAWINGS

FIG. 3 is a flow chart illustrating an embodiment of the present invention.

FIG. 4 is an algorithm illustrating an embodiment of the present invention.

DETAILED DESCRIPTION

Figure 2:
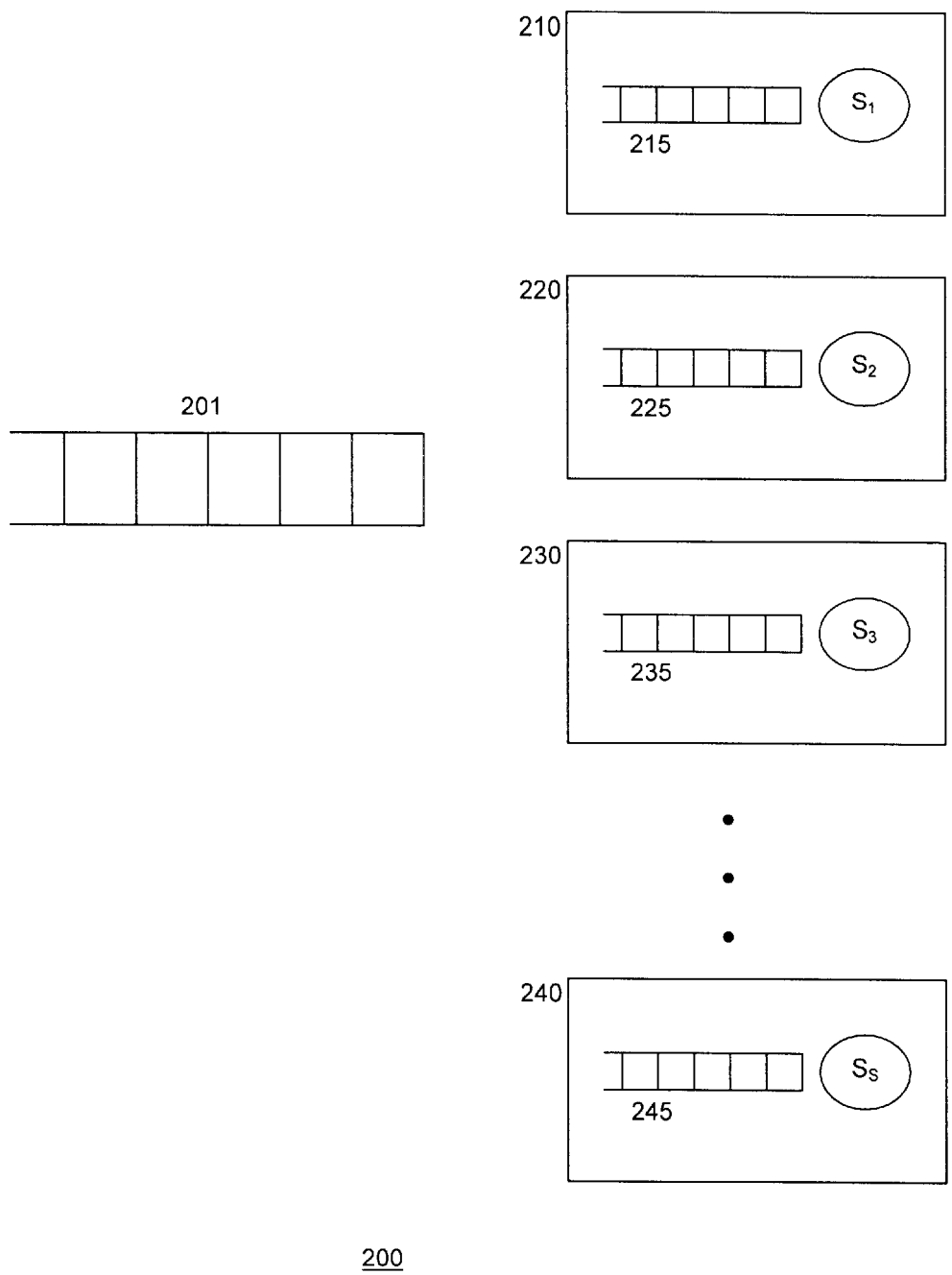
FIG. 2 is an abstract diagram of the internal queues in a server illustrating an embodiment of the present invention.

FIG. 2 is an abstract diagram of the internal queues in a server 200 illustrating an embodiment of the present invention. The server 200 has S number of sockets available, shown in FIG. 2 as sockets 210, 220, 230 and 240. Clients receive service from the server by establishing a connection to one of the server's sockets. For example, connections to web servers on the Internet are opened and closed using the semantics of the Transmission Control Protocol (TCP).

Figure 1:
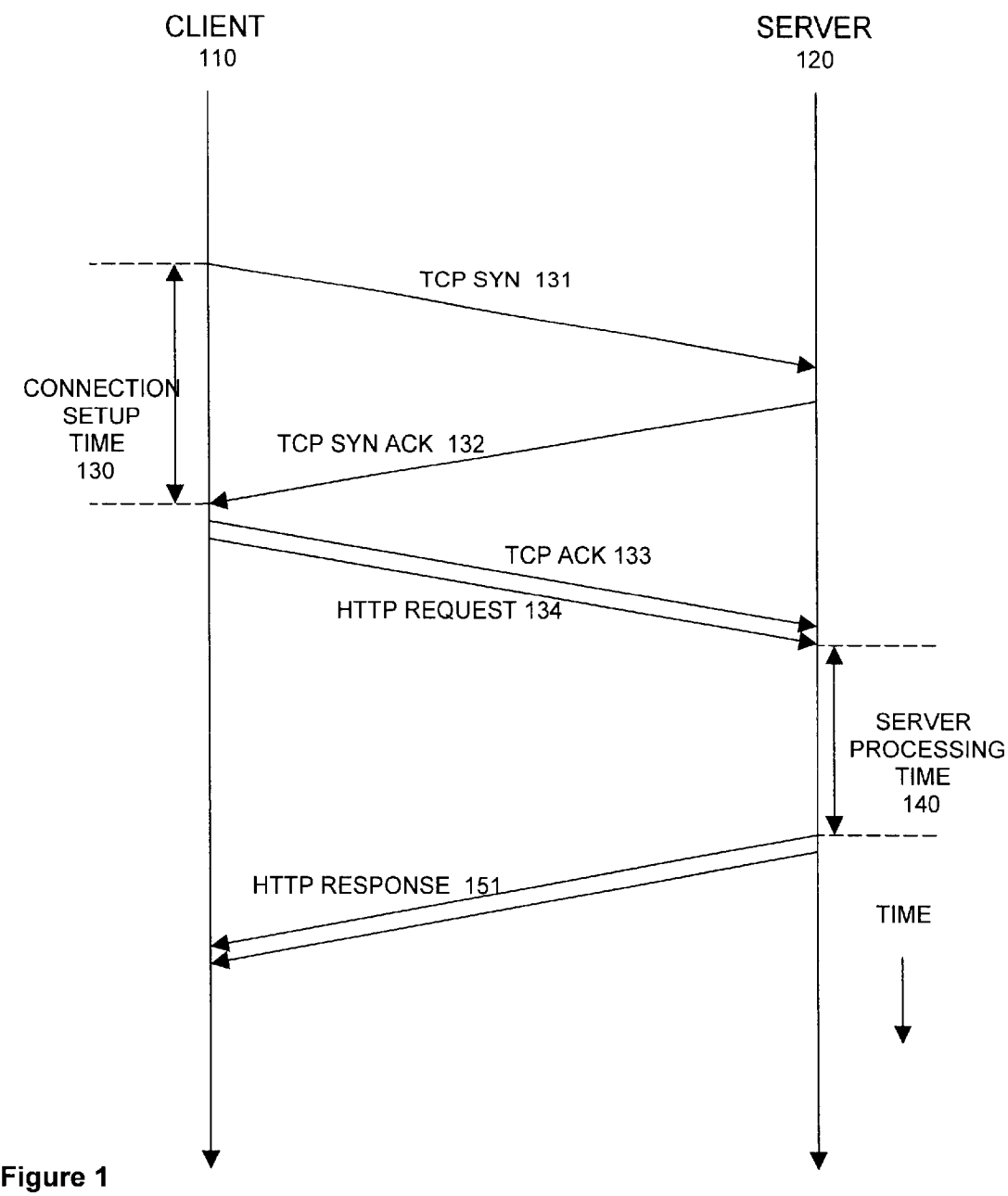
FIG. 1 is a diagram illustrating the connection process of a typical HTTP session.

Using TCP, opening a connection incurs an overhead delay of two network round trip delays, as shown in FIG. 1. Closing the connection renders the socket unavailable for a period of time τ corresponding to the time the socket spends in the TCP's time-wait state.

The server 200 has a common server queue 201, and each socket has its own corresponding queue, i.e. 215, 225, 235, and 245. If no socket is available at the time a request from a new client arrives, the request is queued in the server queue 201 to wait on resources.

A socket can be in one of the following states: (i) busy, if the socket is bound to a client; (ii) unavailable if it is in a TCP time-wait state; or otherwise (iii) free. When the server 200 receives a request form a new client at time t, it establishes a connection with the client through a free socket. The socket is then "bound" to the client and a timer of value T(t) is set to unbound the socket and close the connection. If a new request arrives from the same client at time t'≦t+T(t) then the timer is reset to T(t'). If the timer expires, the socket is unbound from the client and the socket becomes unavailable for a period of time τ equal to the duration of TCP's time-wait state; when the time-wait period ends, the socket becomes free and ready to service new clients. Requests from clients which have a bound socket are serviced by the same socket in a first-come first-serve fashion.

The "lifetime" of a socket is defined to be the amount of time between when the socket is bound to a client and the time when the socket becomes free again. The "service delay" is defined to be the period from the request arrival time at the socket queue to the time when the first byte of the reply is sent by the server. This is a measurement of the client throughput. The "queuing delay" is said to be the time a request spends in the server queue waiting on resources. This is a measurement of sockets utilization (or depletion)—when resources are totally depleted, clients have to wait in the server queue. The longer they have to wait, the longer their queuing delays are. A larger timer value T yields a larger throughput as seen by the clients. However, a larger timer value implies that connections are kept idle for longer periods of time and may prevent the server from servicing new clients.

Thus, in accordance with an embodiment of the present invention, it is advantageous to minimize the service delay (hence enhancing the throughput) while keeping the queuing delays bounded (hence reducing the likelihood of total socket depletion). The server should select the largest timer value while reducing the likelihood of any client's queuing delay growing to infinity. During periods of light load, the server should select large timer values to achieve better throughput. During periods of heavy load, the server should select relatively short timer values to conserve resources. Preferably, the server should make some measurement of server load, estimate the number of sockets needed for different timer values for the measured load, and select the largest timer value that does not deplete the available sockets at the server.

One method to keep the queuing delay bounded is to ensure that the expected lifetime of each socket is kept smaller than the number of sockets times the expected inter-arrival period between requests for new connection establishments. Mathematically, this can be expressed as:

$E$[lifetime of a socket]≦$E$[inter-arrival period between new connection requests]·β·S where β≦1. β is used in the equation to permit the server to handle the load with only β·S sockets, hence preserving (1−β)·S sockets to handle bursts of requests. Then, a timer value T* should be chosen such that:

$$T^* = \max\left\{T : \frac{E[Z(T)]}{E[W(T)]} \leq \beta \cdot S\right\}$$

where Z(T) is a variable describing the lifetime of a socket, including the time-wait period τ, and W(T) is a variable describing the inter-arrival period between two connection establishment requests.

Assuming that the inter-arrival periods between requests are independent and identically distributed random variables, the expectations in the above equation may be calculated in manner to create the following expression:

$T^* = \max\{T : G(T) \leq E[Y_1]\}$ where $E[Y_1]$ is an average inter-arrival period between requests at the server. G(T) is given by the following equation:

$$G(T) = \frac{\left(T + \tau + E[X/X \leq T] \cdot \frac{F_X(T)}{1 - F_X(T)}\right) \cdot (1 - F_X(T))}{\beta \cdot S}$$

where $F_x(\ )$ is the aggregate probability distribution of inter-arrival periods between requests form a particular client at the server and $E[X/X \leq T]$ is the expected value of the inter-arrival period between requests conditional on the inter-arrival period being less than the timer value T.

In a preferred embodiment of the present invention, the equations above are utilized in a table-driven approach to select a timer value according to the measured server load and the clients' behaviors. With reference to FIG. 3 which sets forth a flow chart of the process, at step 301, the quantity G(T) is calculated for various values of T between 0 and $T_{max}$ where $T_{max}$ is a design parameter representing the maximum allowable timer value. Since in practice the probability distribution $F_x(\ )$ is not known, various strategies can be utilized to estimate it. For example, an estimate can be obtained using previous server access logs and re-estimated at the end of every day or even every week. The client's inter-request period generally depends on client behavior (think time) as well as the content of the page retrieved. Both of these events do not generally change over short periods of time. Thus, the quantities for G(T) can be calculated in an off-line manner and stored at step 302 in a table indexed by the value of T.

The timer values can then be adapted in a run time phase to the server load. The server periodically (say every Λ seconds) estimates the mean time between request ("MTBR") and selects a timer value T* that achieves the best client throughput without depleting the server resources. Specifically, at step 311 in FIG. 3, the server periodically measures the number of requests N that it receives during a period of time Λ. At step 312, the server estimates MTBR as:

$$MTBR = \frac{\Lambda}{N}$$

Given the MTBR, at step 313, the server can choose the value T* such that:

$T^* = \max\{T : G(T) \leq MTBR\}$

The selection of Λ determines how fast the server reacts to a change in the load. A large Λ makes the server slow in reacting to a change in the load. While, a small Λ makes the server react to transient changes in the load (bursts of requests). Hence, the value of Λ should be properly selected to achieve an acceptable server response.

FIG. 4 sets forth pseudo-code on how the server utilizes T* when handling client requests. When the server receives a request from a client c, it checks if client c has an open connection with the server. In the affirmative, the request is serviced on the same socket, and the socket closing time is reset to the time of the request plus the timer T*. However, if client c does not have an open connection with the server and if resources are available, a new connection is opened. The socket closing time is set to the request arrival time plus the value T* of the timer. If resources are not available, the request can either be rejected or queued to wait on resources.

Simulations conducted by the inventors have shown that the preferred embodiment of the present invention outperforms both a fixed timer solution and a least recently used ("LRU") solution. Using an HTTP/1.1 compliant Web server with 1500 available sockets, the inventors utilized the following parameters during the simulation:

$T_{max}$=1500 seconds,
τ=60 seconds,
β=0.9,
Λ=5 minutes (where network round trip delay RTT=100 milliseconds). The preferred embodiment of the present invention caused the timer value to adapt and become very large, up to 1500 seconds, during light load periods (e.g. 12AM to 6AM and 8PM to midnight). This allowed clients to achieve a better throughput. However, during periods of heavy load (e.g. 8AM to 8PM), the timer became much smaller. The smaller timer value, although resulting in lower client throughput, conserved resources and reduced client queuing delays.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described the present invention in the context of the Internet standard protocols, i.e. HTTP/1.1 and TCP. However, the principles of the present invention could be extended to other similar protocols for communicating between servers and clients. Such an extension could be readily implemented by one of ordinary skill in the art given the above disclosure.

What is claimed is:

1. A method of improving performance of a server enabled to permit connections to clients to persist for a duration equal to a timer value, the method comprising the steps of:

estimating load on the server; and modifying the timer value based on the load on the server, wherein the server has a plurality of sockets enabling connections to a plurality of clients and wherein the timer value is modified to choose a timer value such that an estimated lifetime of each socket is kept smaller than the number of socket times an estimate of an inter-arrival period between requests for new connections to the server.

2. A server comprising:

a socket for connection with a client;

a machine readable storage device for storing a timer value where the server is enabled to permit connections to clients to persist for a duration equal to the timer value;

a central processing unit connected to the storage device and the socket for executing computer program instructions, the computer program instructions causing the central processing unit to perform the steps of:
   estimating load on the server; and
   modifying the timer value based on the load on the server, wherein the server has a plurality of sockets enabling connections to a plurality of clients and wherein the timer value is modified to choose a timer value such that an estimated lifetime of each socket is kept smaller than the number of sockets times an estimate of an inter-arrival period between requests for new connections to the server.

3. A computer readable medium containing executable program instructions for performing a method on a server enabled to permit connections to clients to persist for a duration equal to a timer value, the method comprising the steps of:

estimating load on the server; and modifying the timer value based on the load on the server, wherein the server has a plurality of sockets enabling connections to a plurality of clients and wherein the timer value is modified to choose a timer value such that an estimated lifetime of each socket is kept smaller than the number of socket times an estimate of an inter-arrival period between requests for new connections to the server.

* * * * *